United States Patent [19]

Muller

[11] 4,268,176
[45] May 19, 1981

[54] PLANETARY EXTRUDER FOR THERMOPLASTICS MATERIAL

[75] Inventor: Werner Muller, Hanover, Fed. Rep. of Germany

[73] Assignee: Hermann Berstorff Maschinenbau GmbH, Hanover, Fed. Rep. of Germany

[21] Appl. No.: 110,684

[22] Filed: Jan. 9, 1980

[30] Foreign Application Priority Data

Jan. 12, 1979 [DE] Fed. Rep. of Germany ....... 2900988

[51] Int. Cl.$^3$ .............................................. B29B 1/10
[52] U.S. Cl. ...................................................... 366/83
[58] Field of Search ................................... 366/83–86, 366/300, 301; 425/204, 208; 264/349

[56] References Cited

U.S. PATENT DOCUMENTS

| | | | |
|---|---|---|---|
| 4,176,967 | 12/1979 | Brinkmann et al. | 366/83 |
| 4,192,617 | 3/1980 | Spielhoff | 366/83 |

FOREIGN PATENT DOCUMENTS 2158246  5/1973  Fed. Rep. of Germany ...... 425/204

*Primary Examiner*—Philip R. Coe
*Attorney, Agent, or Firm*—Schwartz, Jeffery, Schwaab, Mack, Blumenthal & Koch

[57] ABSTRACT

In a planetary extruder for extruding thermoplastics materials, a threaded main spindle is meshed with and surrounded by threaded planetary spindle. To improve pull-in of material, the planetary spindles are provided in groups, each group comprising at least three spindles. The first planetary spindle of each group corresponds in length to the main spindle and succeeding spindles, considered in an opposite direction to the direction or orbital movement of the planetary spindles, of each group are each shorter than the spindle which immediately precedes it to form receiving spaces for material fed by a feed screw, which receiving spaces in operation are continuously enlarging.

In one embodiment in each group, the spindles which are successively shorter are followed by spindles which are successively longer.

2 Claims, 4 Drawing Figures

PLANETARY EXTRUDER FOR THERMOPLASTICS MATERIAL

The invention relates to planetary extruders for thermoplastics material.

Apparatus for preparing and extruding thermoplastics material has been previously proposed, comprising a planetary roller extruder having a main screw threaded spindle, a plurality of screw threaded planetary spindles surrounding the main spindle and meshed therewith and a feed screw, at an intake end, secured against relative rotation with respect to the main spindle.

In this previously proposed apparatus (German Published Application No. 21 58 246) alternate ones of the planetary spindles are shortened to form respective material-receiving chambers. It has been found, however, that the material pulling-in action of this apparatus is not always satisfactory. It has also been found that the thread profiles at the ends of the receiving chambers may be damaged when processing certain materials such as plastics chips. This is explained by the fact that plastics chips, which can be a very compact material, may accumulate in the receiving chambers, bringing a not inconsiderable pressure to bear on the threads of the planetary spindles.

It is among the objects of the invention to provide apparatus of the above mentioned kind which has an improved pulling-in action for all kinds of moulding materials.

According to the invention there is provided a planetary roller extruder for thermoplastic materials, having a main screw threaded spindle, a plurality of screw threaded planetary spindles meshed with the main spindle and a feed screw, at an intake end of the extruder, with said main spindle secured against relative rotation with respect to said feed screw, the planetary spindles being provided in groups with each group comprising at least three planetary spindles and with the spindles of each group being successively shorter, considered in a direction around said main spindle opposite to the direction in which the planetary spindles orbit around the main spindle in operation, to form receiving chambers for material fed by said feed screw and to be extruded.

The receiving chambers at the beginning of the extruder proper, which receiving chambers receive thermoplastics material fed by the feed screw, have a volume which, in operation, is continuously enlarging. With the construction according to the invention, the revolving planetary spindles can give uniform opening of the enlarging receiving chambers and the conveying thrust of the feed screw can be absorbed, relatively undisturbed, by the planetary roller spindles. An advantageous result is that the material is pulled-in without being compressed.

The invention can provide the further advantage that accumulations of chips can be dispersed since layers formed in the receiving chambers can be changed. When processing hard, tough moulding materials it is advantageous for the plurality of succeeding planetary spindles in each group becoming shorter in steps to be followed by at least one planetary spindle of that group which is longer than the planetary spindle of that group which immediately precedes it. Such a construction can combine the good feeding action of the planetary spindles from the receiving chambers with gentle pick-up of the material. This is because, instead of one single planetary spindle having to pick-up the material fed into the receiving chamber of the preceding group, the pick-up action is shared between a plurality of the planetary spindles. Even difficult hard and tough materials can then be pulled in without applying a harmful punctiform load to the threads of the planetary spindles.

The invention is diagrammatically illustrated by way of example in the accompanying drawings, in which.

Figure 1:
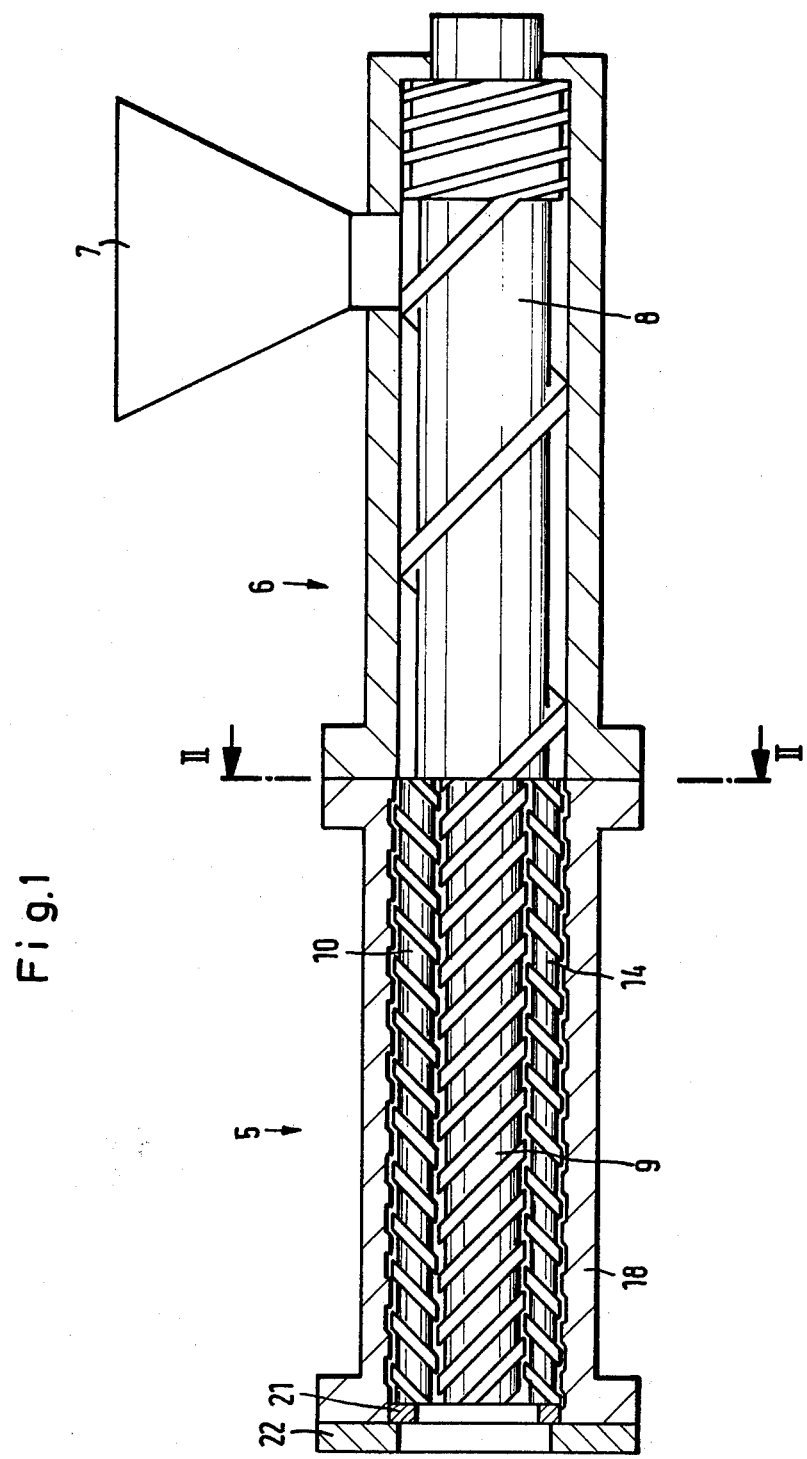
FIG. 1 is a sectional side elevation of a planetary roller extruder according to the invention.
Figure 2:
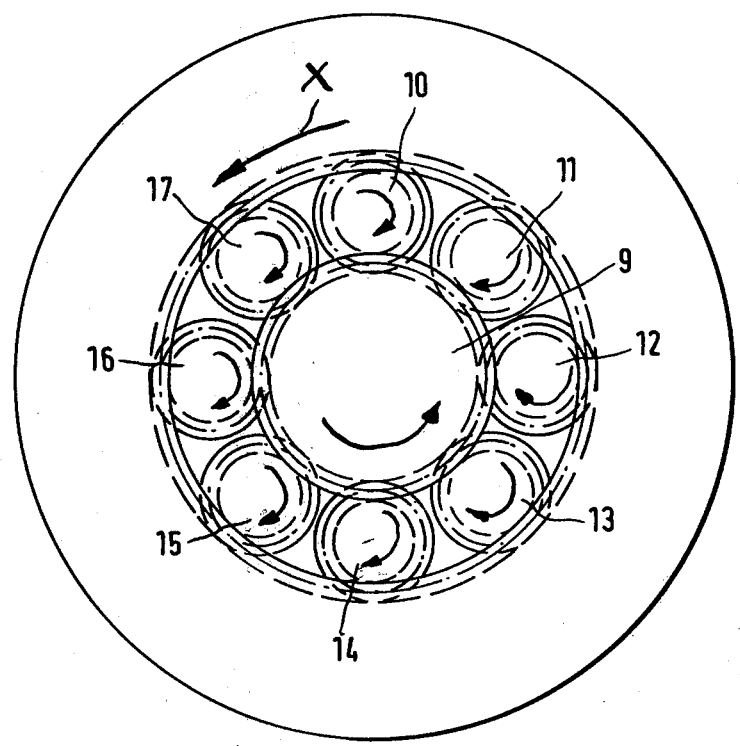
FIG. 2 is a cross-section taken on line II—II of FIG. 1, on a larger scale.

Referring to the drawings, an extruder for preparing and extruding thermoplastic materials (FIG. 1) comprises a planetary roller arrangement 5 and a feed screw arrangement 6 upstream of the roller arrangement. Moulding material to be processed is fed to the feed screw arrangement 6 through a hopper 7. A rotating feed screw 8 conveys the material to the beginning of the planetary roller arrangement 5. A main spindle 9 of the arrangement 5 is secured against rotation with respect to the feed screw 8. Eight planetary spindles 10 to 17 are distributed around the periphery of the main spindle 9. The threads on the planetary spindles 10–17 fit into that on the main spindle 9 and also into the internal thread form of a surrounding cylindrical member 18, and the planetary spindles 10–17 are thereby driven by the main spindle 9 for rotation each about its own axis and in an orbital path around the main spindle 9. The directions of rotation of the spindles 9 to 17 are indicated by arrows in FIG. 2 and the direction of orbital movement of the spindles 10 to 17 is indicated by an arrow X.

Figure 3:
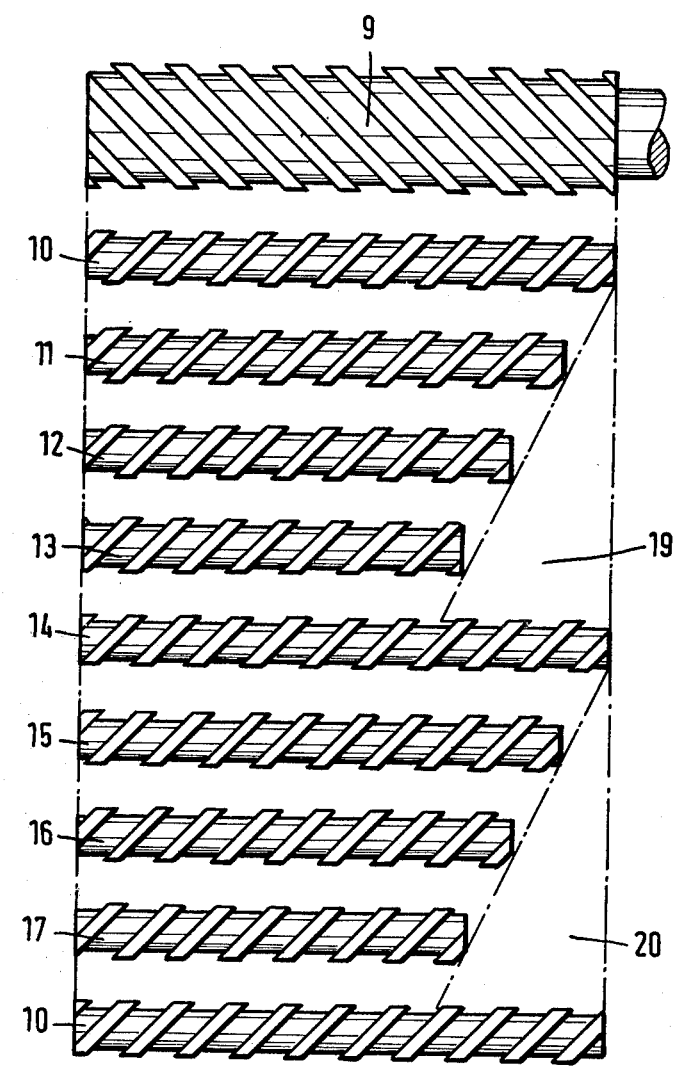
FIG. 3 shows planetary spindles of the extruder of FIG. 1 and according to a first embodiment of the invention, projected into a plane, drawn below a main spindle.

In FIG. 3, the planetary spindles 10 to 17 are shown projected into a plane, below the main spindle 9. The eight planetary spindles 10 to 17 are divided into a first group comprising the spindles 10 to 13 and a second group comprising the spindles 14 to 17. The planetary spindle 10 of the first group has a length equal to the full length of the main spindle 9. Each of the three succeeding planetary spindles 11, 12 and 13 is a uniform amount shorter than the planetary spindle which precedes it having regard to the direction of orbital movement indicated by the arrow X. The resultant material-receiving chamber 19 thus expands uniformly in a direction around the main spindle 9 at a given angle. The shortest and last planetary spindle 13 of the first group is followed by the first planetary spindle 14 of the second group, which again has a length equal to the full length of the main spindle 9. The spindle 14 picks up the material fed into the receiving chamber 19 with a pulling-in length determined by the angle of the receiving chamber 19. The spindle 14 is followed by the spindles 15 to 17, each of which is a uniform amount shorter than the spindle which precedes it. The spindles 14 to 17 of the second group form a receiving chamber 20, which is closed at its end by the planetary spindle 10. The spindle 10 picks up the material fed into the receiving chamber 20.

At the discharge end of the extruder, end surfaces of the planetary spindles 10 to 17 bear against a butting ring 21, which butting ring 21 is inserted at the end of the cylindrical member 18 and located by a screwed-on annular flange 22.

Figure 4:
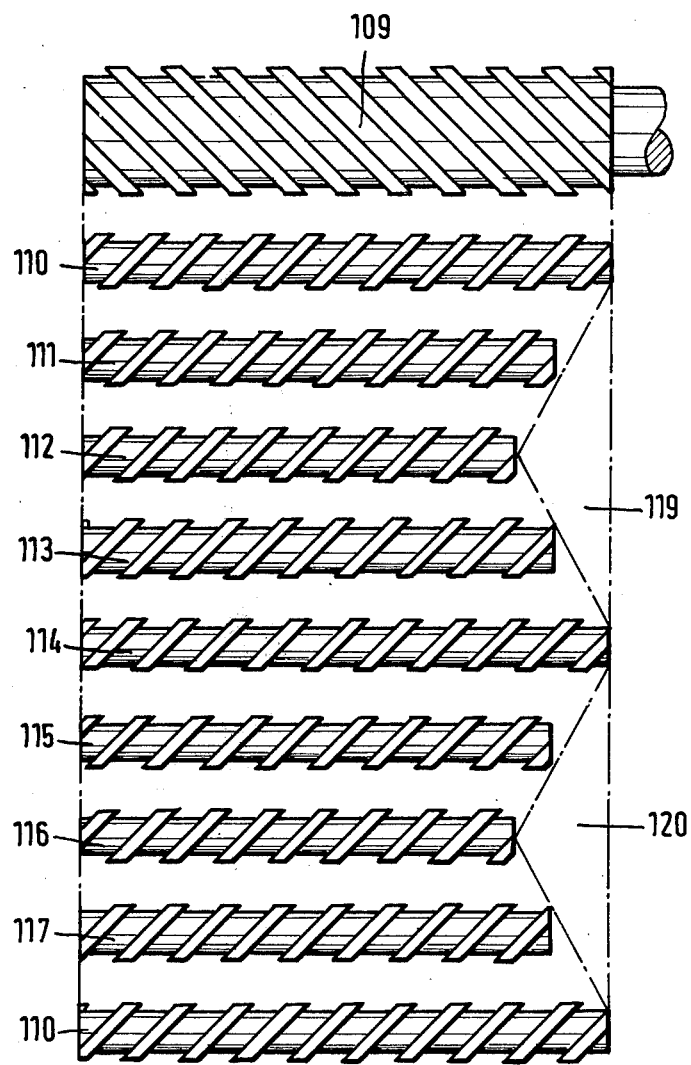
FIG. 4 shows a view similar to FIG. 1 of a second embodiment of the invention, planetary spindles again being projected into a plane, drawn below a main spindle.

In the embodiment of FIG. 4, a main spindle 109 and eight planetary spindles 110 to 117 are shown projected into a plane. The planetary spindles 110 to 117 form two groups, viz 110 to 113 and 114 to 117. The planetary spindle 110 has the same length as the main spindle 109. Each of the two planetary spindles 111 and 112 following the planetary spindle 110 is a uniform amount shorter than the planetary spindle which precedes it. After the spindle 112 the length of the spindles again increases, by a given equal amount in each case. The material conveyed into a receiving chamber 119 is thus picked up and pulled in not only by the spindle 114 which is the first spindle of the second group but also by the spindle 13 which is the last spindle of the first group. The spindles 114 to 110 of the second group are similarly proportioned to those of the first group and form a receiving chamber 120.

The embodiment of FIG. 4 has the advantage that two planetary spindles of each group pull-in material.

What is claimed is:

1. In a planetary roller extruder for thermoplastic material, which said extruder has a main screw threaded spindle, a plurality of screw threaded planetary spindles meshed with said main spindle and a feed screw, at an intake end of said extruder, with said main spindle secured against relative rotation with respect to said feed screw, the improvement comprising providing said planetary spindles in groups with each of said groups comprising at least three of said planetary spindles and with said planetary spindles of each of said groups successively shorter, considered in a direction around said main spindle opposite to the direction in which said planetary spindles orbit around said main spindle in operation, to form receiving chambers for said material fed by said feed screw and to be extruded.

2. The invention claimed in claim 1, wherein, in each of said groups, said ones of said planetary spindles which are successively shorter are followed by at least one of said planetary spindles of that group which is longer than that one of said planetary spindles of that group which immediately precedes it.

* * * * *